United States Patent
Dokukin et al.

(10) Patent No.: US 9,541,575 B2
(45) Date of Patent: Jan. 10, 2017

(54) EXPLOITATION OF SECOND-ORDER EFFECTS IN ATOMIC FORCE MICROSCOPY

(71) Applicant: Tufts University, Medford, MA (US)

(72) Inventors: Maxim Dokukin, Lunenburg, MA (US); Igor Sokolov, Medford, MA (US)

(73) Assignee: TUFTS UNIVERSITY, Arlington, VA (US)

( * ) Notice: Subject to any disclaimer, the term of this patent is extended or adjusted under 35 U.S.C. 154(b) by 32 days.

(21) Appl. No.: 14/554,394

(22) Filed: Nov. 26, 2014

(65) Prior Publication Data
US 2016/0146853 A1    May 26, 2016

(51) Int. Cl.
*G01Q 30/04* (2010.01)
*G01Q 60/32* (2010.01)

(52) U.S. Cl.
CPC .............. *G01Q 30/04* (2013.01); *G01Q 60/32* (2013.01)

(58) Field of Classification Search
CPC ......... B82Y 35/00; G01Q 30/04; G01Q 60/24; G01Q 60/28; G01Q 60/32; G01Q 60/36; G01Q 60/02; G01Q 60/368
See application file for complete search history.

(56) References Cited

U.S. PATENT DOCUMENTS

| | | | | |
|---|---|---|---|---|
| 2006/0150719 A1* | 7/2006 | Reinstadtler | ........... | B82Y 35/00 73/105 |
| 2007/0114406 A1* | 5/2007 | Spizig | ................. | B82Y 35/00 250/310 |
| 2008/0022759 A1* | 1/2008 | Su | ....................... | B82Y 35/00 73/105 |
| 2010/0122385 A1* | 5/2010 | Hu | ...................... | B82Y 35/00 850/5 |
| 2012/0131702 A1* | 5/2012 | Shi | .................... | G01Q 10/065 850/1 |
| 2013/0276175 A1* | 10/2013 | King | .................. | B82Y 35/00 850/40 |

* cited by examiner

*Primary Examiner* — David E Smith
(74) *Attorney, Agent, or Firm* — Nadya Reingand

(57) ABSTRACT

A processing system cooperates with an atomic force microscope operating in ramp mode at a ramp frequency is configured to collect data indicative of at least one of physical and chemical properties of a sample. The system collects data indicative of probe movement at a frequency that is higher than the ramp frequency. This data comprises a second-order portion of the probe's signal. Based at least in part on the second-order portion, the processor obtains a parameter that is indicative at least one of a physical and a chemical property of a sample.

20 Claims, 4 Drawing Sheets

EXPLOITATION OF SECOND-ORDER EFFECTS IN ATOMIC FORCE MICROSCOPY

FIELD OF INVENTION

The invention relates to scanning probe microscopy, also known as atomic force microscopy, and in particular, to processing of the output of an atomic force microscope to evaluate surface parameters.

BACKGROUND

Scanning probe microscopy, also known as atomic force microscopy, is a way to study force interactions between a probe and sample surface. It is broadly used to visualize features on a sample surface that have dimensions from hundreds of microns down to sub-nanometer scale.

In atomic force microscopy, a probe attached to a cantilevered member responds to forces that result from proximity or contact with some sample surface. This force affects the tip's motion. The tip's motion therefore provides a measure of the force.

By scanning the probe's tip across the surface of a sample, one can obtain values of the extent of deflection as a function of spatial position. This allows one to build a two-dimensional map showing values of some surface parameter.

A difficulty that arises is that building such a map takes time because an entire region needs to be scanned. An obvious solution to the problem of slow scanning is to scan faster. But a cantilever arm has its own resonance characteristics. When one scans faster, the output signal of the microscope becomes a superposition of three components. The first component consists of the deflections caused by slow mechanical interaction with the surface. The second component consists of various second-order effects, such as deflections that arise from all other sources, including those that arise from the dynamic properties of the cantilever arm itself, and/or from the sliding interaction between the AFM probe and sample surface. The third component consists of instrumental and environmental noise.

From the combination of these three components, one can filter out an output signal. However, this filtering process is not perfect. As a result, the output signal can show artifacts that impair the accuracy of the measurement. To minimize formation of such artifacts, it is known to slow down the scanning. But this results in undesirable excessively slow scanning.

SUMMARY

The invention is based at least in part on the recognition that portions of a signal received from an atomic force microscope that have hitherto been regarded as parasitic or as noise, and that have, in the past, been filtered out to avoid formation of artifacts, can in fact be used to obtain useful properties of a surface being scanned by the microscope.

In one aspect, the invention features an apparatus and method, including hardware and software, for data collection and data analysis to obtain information about physical and chemical properties of materials in atomic force microscopy. The novel apparatus and method allows surface mapping of previously unmeasured parameters, as well as faster mapping of previously known parameters. These parameters include the restored adhesion, the averaged restored adhesion, the restored adhesion height, the zero-deflection height, the viscoplastic height shift, the dynamic creep phase shift, stick-slip response, and viscoelastic adhesion response.

In one aspect, the invention features an apparatus for evaluating a physical or a chemical property of a surface. Such an apparatus includes a processing system that cooperates with an atomic force microscope operating in ramp mode at a ramp frequency. The processing system collects data indicative either physical or chemical properties of a sample. In particular, the processing system receives a probe signal indicative of movement of a probe at a frequency that is higher than the ramp frequency. The probe signal includes first portion and second portions. The first portion indicates deflection. The second portion consists of second-order effects. The processing system obtains a parameter that is indicative either a physical or a chemical property of a sample based at least in part on this second portion of the probe signal.

In some embodiments, the processing system receives a probe signal that includes contact and rebound portions. In these embodiments, the second portion includes the rebound portion. Among these embodiments are those in which the processing system obtains a restored adhesion, those in which it obtains an average restored adhesion, those in which it is obtains a viscoelastic adhesion response, and those in which it obtains a viscoplastic height shift.

In other embodiments, the processing system receives a probe signal has a noise portion and a scanner portion. The noise portion includes noise in the contact portion of the probe signal. The scanner portion controls ramping motion of the probe. Among these are embodiments in which the processing system is configured to obtain a restored adhesion height, and those in which it is configured to obtain a zero deflection height.

Among those embodiments that are configured to obtain a zero deflection height are those in which the zero deflection height is determined based on a retraction curve and those in which it is determined based on an approach curve.

Embodiments further include those in which processing system receives a probe signal in which the second portion includes periodic oscillation superimposed on the contact portion of the probe signal during contact of the probe with the sample. Among there are embodiments in which the processing system obtains a parameter indicative of slip-stick motion, including those in which the processing system obtains a parameter indicative of slip-stick motion based on oscillation superimposed on an approaching portion of the contact portion, and those in which it obtains a parameter indicative of slip-stick motion based on oscillation superimposed on a retracting portion of the contact portion.

In other embodiments, the processing system receives a probe signal and a scanner signal that controls ramping motion of the probe. This processing system obtains a parameter indicative of dynamic creep phase shift. Among these are embodiments in which the processing system is configured for offline processing.

Also included are embodiments in which the processing system is configured for real-time processing, those in which it includes a floating-point gate array for real-time processing.

Some embodiments further include an atomic force microscope coupled to the processing system. In these embodiments, the processing system is configured to receive the probe signal from the atomic force microscope.

These and other features of the invention will be apparent from the accompanying detailed description and the figures, in which:

DETAILED DESCRIPTION

Figure 1:
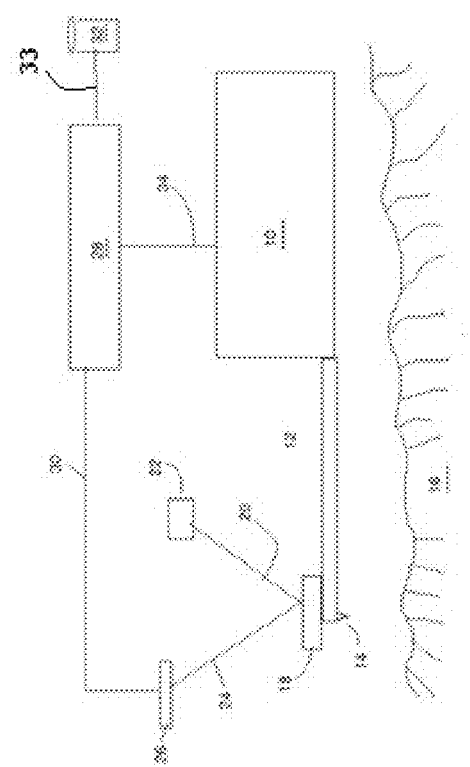
FIG. 1 shows a simplified diagram of one example of an atomic force microscope.

FIG. 1 shows a scanner 10 that supports a cantilever 12 to which is attached a probe 14. The probe 14 is thus cantilevered from the scanner 10. The scanner 10 moves the probe 14 along a scanning direction that is parallel to a datum of the sample surface 16. In doing so the scanner 10 scans a region of a sample's surface 16. While the scanner is moving the probe 14 in the scanning direction, it is also moving it in a vertical direction perpendicular to the datum of the sample surface 16. This causes the distance from the probe 14 to the surface 16 to vary.

The probe 14 is generally coupled to a reflective portion of the cantilever 12 that reflects an illumination beam 20 provided by a laser 22. This reflective portion of the cantilevered 12 will be referred to herein as a mirror 18. A reflected beam 24 travels from the mirror 18 to a photodetector 26, the output of which connects to a processor 28. In some embodiments, the processor comprises FPGA electronics to permit real time calculation of surface parameters.

The movement of the probe 14 translates into movement of the mirror 18, which then results in different parts of the photodetector 26 being illuminated by the reflected beam 24. This results in a probe signal 30 indicative of probe movement. The processor 28 calculates certain surface parameters based on the probe signal 30 using methods described below and outputs the results 33 to a storage medium 32. These results 33 include data representative of any of the surface parameters described herein.

The scanner 10 is also connected to the processor 28 and provides to it a scanner signal 34 indicative of scanner position. This scanner signal 34 is also available for use in calculating surface parameters.

Figure 2:
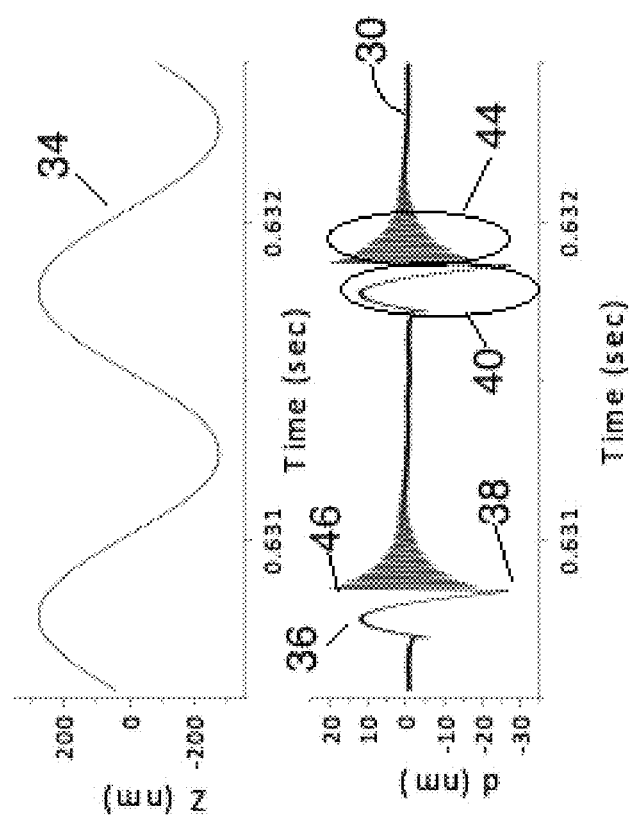
FIG. 2 shows an example of the probe signal and the scanner signal of the atomic force microscope of FIG. 1.

In general, the motion of the scanner 10 in the vertical direction is a harmonic oscillation, as shown in FIG. 2. Thus, as the scanner 10 moves concurrently in the scanning direction, the probe 14 traces a sinusoidal path having an amplitude and spatial frequency, as shown by the scanner signal 34 in FIG. 2. As it does so, the probe 14 alternately dips toward and then rises from the surface 16. This mode of operation is referred to herein as "ramping mode." The frequency of oscillation is the "ramping frequency."

A typical probe signal 30 is shown in FIG. 2. According to the probe signal 30, as the scanner 10 moves toward the surface along the vertical direction, the probe 14 eventually contacts the surface 16. The time at which this occurs is the "moment of contact" 36. As the scanner 10 continues to move downward towards the surface 16, the cantilever 12 deflects and the surface 16 deforms in response to the spring force exerted by the now deflected cantilever 12. The maximum force is reached in the position of maximum deflection of the cantilever 37.

As the scanner 10 starts to move vertically away from the surface 16, an adhesion force between the probe 14 and the surface 16 causes a portion of the surface 16 to deform in an effort to follow the upward motion of the probe 14. Eventually, when the probe 14 has risen enough, a restoring force inherent in the sample's material exceeds the adhesion force. At this point, the probe 14 and the surface 16 separate. The time at which this occurs is the moment of release 38. The portion of the curve between the moment of contact 36 and "moment of release" 38 is the "contact portion" 40 of the probe signal 30.

During the time between the moment of release 38 and a subsequent moment of contact 42, the cantilever 12 rings. This ringing gradually dies down as a result of damping forces within the cantilever 12. The portion of the probe signal 30 that includes this ringing is the rebound portion 44. The rebound frequency is typically much higher than the ramp frequency.

The vertical position of the probe 14 at the moment of release 38 provides information indicative of the adhesion force at a particular spatial location on the surface 16. The rebound portion 44, however, is generally regarded as a second-order effect. It is typically filtered out, and not used to determine any surface parameters.

Unlike a general-purpose processor, the illustrated processor is a special purpose particular machine that has been tied to the atomic force microscope and that has had its structure modified by having been programmed for determining various surface parameters, such as adhesion forces, surface stiffness, phase change, surface height position, and viscoelastic energy losses. It is well established that function is a result of structure. Therefore, if a first article is incapable of performing a function whereas a second article is, then the two articles must have different structures. The processor 28 is capable of performing the functions recited below and is therefore structurally different from processors that cannot perform those functions. In particular, prior art processors are not programmed for determining surface parameters such as adhesion forces, surface stiffness, phase change, surface height position, and viscoelastic energy losses in the manner described herein.

The processor 28 is programmed and configured such that, in the process of determining surface parameters, what would ordinarily be regarded as mere second-order effects plays an essential role.

For example, the rebound portion 44, which is ordinarily filtered out, actually represents energy that has been stored in the cantilever 12 as a result of work done by the force of adhesion. Measurement of this stored energy thus provides an indication of the work done by the force of adhesion, which, in conjunction with the spring constant of the cantilever 12, can be used to determine that force.

A first parameter that can be calculated is the force of restored adhesion, $F_{ra}$. The force of restored adhesion can be derived from the rebound portion 44 by measuring the maximum of the rebound portion 44, $d_{maxrebound}$, the quality factor Q of the oscillations seen in the rebound portion 44, and the spring constant, K, of the cantilever 12. The quality factor Q is a measure of how fast the oscillation cycles are decreasing in the rebound signal shown in FIG. 2. The quality factor can be calculated from the rebound portion 44 by using known standard formulas. In addition, the quality factor Q and the spring constant K can be determined using the thermal fluctuation method, which is standard in atomic force microscopy. Both of these parameters can be found independently of the actual scanning procedure.

The maximum rebound, $d_{maxrebound}$, is the first maximum 46 of the rebound portion 44 shown in FIG. 2. To obtain the force of restored adhesion, one defines a restored deflection $d_{ra}$ by weighting the maximum rebound 46 by a factor of $\exp(\pi/2Q)$. The force of restored adhesion, $F_{ra}$ can then be found by application of Hooke's law: $F_{ra}=K \cdot d_{ra}=K \cdot d_{maxrebound} \cdot \exp(\pi/2Q)$.

Knowledge of specific values of various physical properties of the apparatus described herein, such as its spring constant or quality factor, is only necessary to obtain absolute values of restored adhesion. When only relative values of force are of interest, it is not necessary to actually determine values of spring constant or quality factor. Instead, default values $K_{default}$ and $Q_{default}$ are used. If necessary, relative values of restored adhesion can readily be transformed into absolute values through multiplication of each value by $K \cdot \exp(\pi/2Q)/K_{default} \cdot \exp(\pi/2Q_{default})$.

Sample code for carrying out the foregoing procedure is as follows:

```
PROCEDURE FRA(DMAXR, Q, K, KDEF, QDEF, RELATIVE)
BEGIN {
REAL DMAXR, Q, K, KDEF, QDEF, PI;
BOOLEAN RELATIVE;
PI := 3.141592654
IF BOOLEAN THEN FRA := K·DMAXR·EXP(PI/2Q)
ELSE FRA := KDEF·DMAXR·EXP(PI/2QDEF)
ENDIF;
}
END
```

A related quantity that can be determined is the difference between the restored adhesion force and the adhesion force that is calculated based on the value of d at the moment of release 38, i.e. $d_{release}$. Again, based on Hooke's law, the force of adhesion calculated based on $d_{release}$ is $K \cdot d_{release}$. The difference is therefore $K \cdot (d_{release} - d_{maxrebound} \cdot \exp(\pi/2Q))$. This parameter is referred to as the "viscoelastic adhesion response."

Typical code for carrying out the above procedure is

```
PROCEDURE VISCOADHESION(DRELEASE, DMAXREBOUND, Q, K)
BEGIN
{
REAL DRELEASE, DMAXREBOUND, Q, K;
REAL VISCOADHESION, PI;
PI := 3.141592654
VISCOADHESION := k· (DRELEASE -
DMAXREBOUND ·EXP(PI/2Q))
ENDIF;
}
END
```

Another parameter that can be calculated based on the rebound portion 44 is the averaged restored adhesion, ave ($F_{ra}$). This calculation uses several values of the rebound portion 44, and not just the maximum rebound 46. According to this method, the rebound portion 44 is averaged by its absolute values for some user-defined interval. This interval can be defined in units of time or, more conveniently, in oscillation periods. The average restored adhesion is determined by dividing each of N values of the cantilever rebound signal at time $t_k$ by the product of $\exp(-f_0 t_k/Q)$ and $|\sin((2\pi)f_0 t_k+\phi)|$, where Q is the quality factor of the oscillation defined previously. The divided values are then added together and the resulting sum divided by N to yield an averaged restored adhesion.

In some embodiments, signal values below some threshold are not counted towards N and are not used in calculating the averaged restored adhesion. This avoids corrupting the calculation with noise in the rebound signal.

Another parameter that can be determined is the restored adhesion height, $H_a$. Referring to FIG. 2, this is the value of Z on the scanner signal 34 when the value of d is most negative in the probe signal 30. Said differently, this is the height of the scanner 10 at the moment of release 38, which is the moment when the probe 14 just detaches from the surface. Determining the time of the moment of release 38 and looking up the corresponding height of the scanner 10 can determine the restored adhesion height. Suitable code for carrying this out is as follows:

```
PROCEDURE RESTORED_ADHESION_HT (SCANNER, PROBE)
BEGIN
{
REAL SCANNER( ), PROBE( ),RESTORED_ADHESION_HT;
INTEGER J;
/* IDXMINVEC(V,I) = BUILT IN FUNCTION RETURNS INDEX OF
I^{TH} OCCURRENCE OF MINIMUM VALUE OF VECTOR V */
J := IDXMINVEC (PROBE, 1);
RESTORED_ADHESION_HT := SCANNER(J);
}
END
```

Another parameter that can be determined is the zero adhesion height, $H_0$. Referring to FIG. 2, this is the value of Z on the scanner signal 34 when the value of d crosses zero in the probe signal 30 for the first time after reaching the maximum positive deflection. Said differently, this is the height of the scanner 10 when the probe position signal 30 crosses zero between the position of maximum deflection 37 and the moment of release 38. Determining the time at which this zero crossing occurs and looking up the corresponding height of the scanner 10 can determine the zero-adhesion height. Suitable code for carrying this out is as follows:

```
PROCEDURE ZAH(SCANNER, PROBE)
BEGIN{
INTEGER J;
REAL SCANNER( ), PROBE( ), ZAH;
/* IDXZERO(V,I) IS BUILT-IN FUNCTION TO RETURN INDEX OF
I^{TH} FIRST ZERO IN VECTOR ARGUMENT */
J := IDXZERO(PROBE, 1);
ZAH := SCANNER(J);
}
END
```

As shown in FIG. 2, the probe signal 30 has two zero crossings, i.e. two points at which d=0. The first zero crossing ends an approaching section of the contact portion 40 and the second zero crossing begins a retracting section of the contact portion 40. The first and second zero crossings correspond to values of Z on the scanner signal 34. The difference between these two values provides a measure of viscoplastic height shift. This is the shift in the sample height as a result of viscoelastic and plastic deformation following contact with and release from the probe 14. Suitable code for carrying out this procedure is as follows:

```
PROCEDURE VISCOHEIGHTSHIFT(SCANNER, PROBE)
BEGIN{
INTEGER J,K;
REAL SCANNER( ), PROBE( );
REAL VISCOHEIGHTSHIFT;
/* IDXZERO(V,I) IS BUILT-IN FUNCTION TO RETURN INDEX OF
I^{TH} FIRST ZERO IN VECTOR ARGUMENT */
J := IDXZERO(PROBE, 1);
K := IDXZERO(PROBE, 2);
```

```
S1 := SCANNER(J);
S2 := SCANNER(K);
VISCOHEIGHTSHIFT:= S2-S1;
}
END
```

For a perfectly rigid surface, the minimum value of the probe signal will occur at the same time as the minimum value of the scanner signal. However, for surfaces that experience plastic deformation, there can be a difference in the scanner signal 34 between these two events. This signal difference arises from viscous creep in the material.

The term "creep" is used for a slow change in equilibrium position of a material in response to a constant load. Because the scanner 10 is moving the cantilever 12 up and down, the load on the surface 16 will not be constant. Under these conditions, where the equilibrium position of a surface 16 changes in response to a dynamic load, the resulting creep is said to be "viscous creep," or "dynamic creep." This viscous creep can be detected from a phase difference between the maximum of the scanner signal 34 and a corresponding maximum of the probe signal 30. The phase difference is given by $2\pi \cdot f_o \cdot \Delta t$ where $\Delta t$ is the interval between the two maxima, and $f_o$ is the frequency of the scanner signal 34.

```
PROCEDURE DYNAMIC_CREEP(SCANNER, PROBE, TIME, F0)
BEGIN {
REAL F0, SCANNER( ), PROBE( ), TIME( ), T1, T2;
REAL DYNAMIC_CREEP, PI;
INTEGER J1, J2;
PI := 3.141592654
J1 := IDXMAX (SCANNER, 1);
J2 := IDXMAX (PROBE, 1);
T1 : = TIME(J1);
T2 := TIME(J2);
DYNAMIC_CREEP:= 2*PI*F0*(T1-T2);
}
END
```

A phase as computed above will be a relative phase because of unknown initial delay between the probe signal 30 and the scanner signal 34. This delay arises from internal electronic processing and delays. The phase shift can be found in absolute units by calibration using a rigid sample, for example, a silicon wafer or a flat clean glass slide. The phase recorded on this material will then be subtracted from phase recorded on the sample material. This can be implemented either offline or for real-time processing.

Yet another parameter that can be measured is the stick-slip response of the sample surface. Stick slip arises because the coefficient of static friction is different from the coefficient of dynamic friction. As a result of this characterized by sudden stops and starts that are translated into oscillations in the position of the tip.

Figure 3:
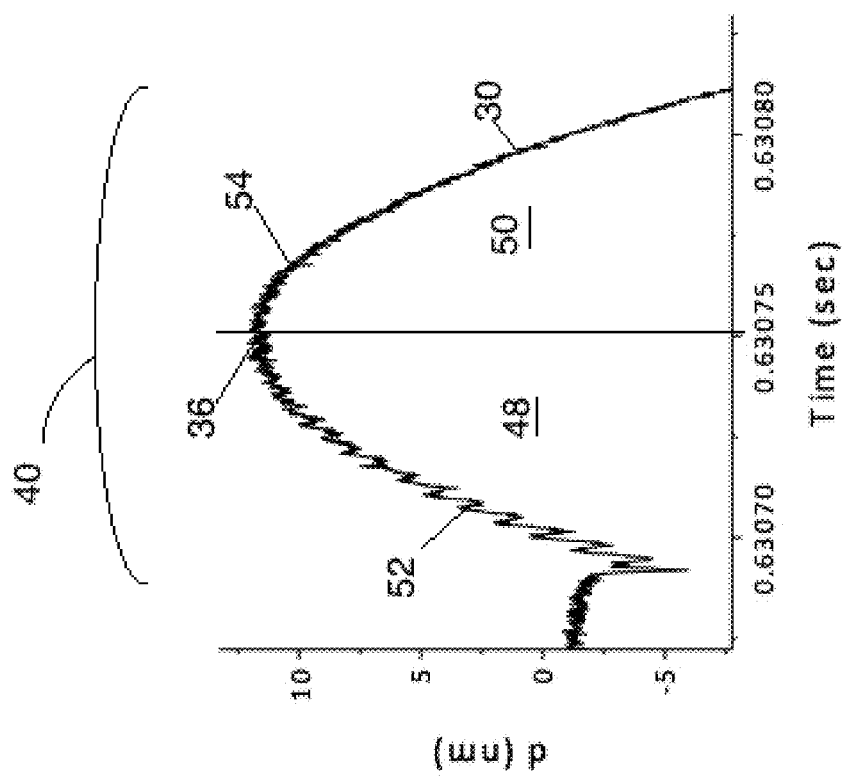
FIG. 3 shows a close-up of the contact region of the probe signal of FIG. 2 showing stick-slip induced oscillations.

FIG. 3 shows a close up of the contact portion 40 of the probe signal 30 in FIG. 2. The contact portion 40 has an approaching section 48 prior to the moment of contact 36 and a retracting section 50 that follows the moment of contact 36 but prior to the moment of release 38. As is apparent, the approaching section 48 is characterized by high-frequency oscillations 52. Similar but heavily attenuated high frequency oscillations 54 are on the retracting section 50. The amplitude and frequency of these high-frequency oscillations 52, 54 depend on the speed of scanning. As a result, these oscillations 52, 54 are believed to arise from stick-slip.

The high-frequency oscillations 52, 54 shown in FIG. 3 have in the past been considered as extraneous second-order effects. However, the processor 28 is configured for determining the amplitude and frequency of these oscillations 52, 54 as a basis for characterizing slip-stick motion of the surface 16. In one embodiment, the amplitude and frequency for both the retracting section 50 and the approaching section 48 form the basis for characterizing slip-stick motion.

Figure 4:
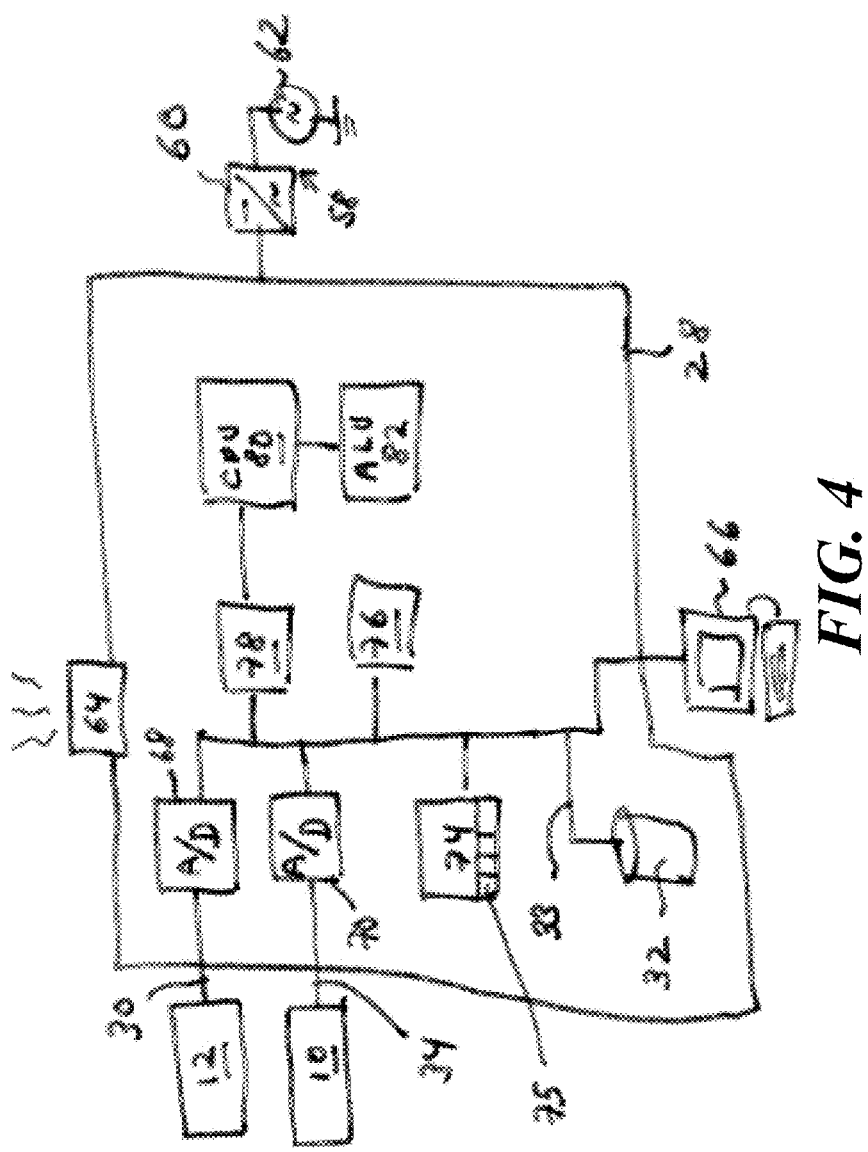
FIG. 4 shows additional detail in the processing system of FIG. 1.

FIG. 4 shows the processing system 28 in detail. The processing system 28 features a power supply 58 having an AC source 60 connected to an inverter 62. The power supply 58 provides power for operating the various components described below. The processing system further includes a heat radiator 64.

In a preferred embodiment, the processing system 28 further includes a user interface 66 to enable a person to control its operation.

The processing system 28 further includes first and second A/D converters 68, 70 for receiving the probe signal and the scanner signals and placing them on a bus 72. A program storage section 74, a working memory 76, and CPU registers 78 are also connected to the bus 72. A CPU 80 for executing instructions 75 from program storage 74 is connected to both the registers 78 and an ALU 82. These instructions 75 are stored on a non-transitory computer-readable medium and include instructions that, when executed, cause the processing system 28 to calculate any of the foregoing parameters based on inputs received through the first and second A/D converters 68, 70.

A specific example of the processing system 28 may include FPGA electronics, which stores all processing algorithms for calculation of the surface parameters described above.

Having described the invention and a preferred embodiment thereof, what is claimed as new and secured by Letters Patent is:

1. An apparatus for evaluating one of a physical and a chemical property of a surface, said apparatus comprising a processing system configured to cooperate with an atomic force microscope operating in a nonresonant ramp mode at a ramp frequency, said processing system being configured to collect a data indicative of at least one of the physical and the chemical properties of a sample, wherein said processing system is configured to receive a probe signal indicative of a movement of a probe at a frequency that is higher than said ramp frequency;

wherein said probe signal comprises a contact portion and a rebound portion, and wherein said probe signal comprises a first portion indicative of a cantilever deflection of said atomic force microscope and a second portion that consists of second-order effects of motion of said cantilever;

and wherein said processing system is further configured to obtain through processing a parameter that is indicative at least one of the physical and the chemical property of the sample based at least in part on said second portion of said probe signal;

wherein the second order effects of either contact or rebound portions of the probe signal are processed to provide information about said parameter.

2. The apparatus of claim 1, wherein said processing system is configured to obtain a restored adhesion.

3. The apparatus of claim 1, wherein said processing system is configured to obtain an average restored adhesion.

4. The apparatus of claim 1, wherein said processing system is configured to obtain a viscoelastic adhesion response.

5. The apparatus of claim 1, wherein said processing system is configured to receive the probe signal having a noise portion that comprises a noise in said contact portion of said probe signal, and a scanner signal that controls ramping motion of said probe;

wherein said a noise further comprises the second-order effects.

6. The apparatus of claim 5, wherein said processing system is configured to obtain a restored adhesion height.

7. The apparatus of claim 5, wherein said processing system is configured to obtain a zero deflection height.

8. The apparatus of claim 7, wherein said zero deflection height is determined based on a retraction curve.

9. The apparatus of claim 7, wherein said zero deflection height is determined based on an approach curve.

10. The apparatus of claim 5, wherein said processing system is configured to obtain a viscoplastic height shift.

11. The apparatus of claim 1, wherein said processing system is configured to receive and process the probe signal in which said second portion comprises a periodic oscillation superimposed on said contact portion of said probe signal during contact of said probe with said sample.

12. The apparatus of claim 11, wherein said processing system is configured to obtain a parameter indicative of a slip-stick motion.

13. The apparatus of claim 12, wherein said processing system is configured to obtain the parameter indicative of slip-stick motion based on oscillation superimposed on an approaching portion of said contact portion.

14. The apparatus of claim 12, wherein said processing system is configured to obtain the parameter indicative of slip-stick motion based on oscillation superimposed on a retracting portion of said contact portion.

15. Apparatus of claim 1 wherein said processing system is configured to receive a probe signal, wherein said processing system is further configured to receive a scanner signal that controls ramping motion said probe.

16. The apparatus of claim 15, wherein said processing system is configured to obtain a parameter indicative of dynamic creep phase shift.

17. The apparatus of claim 1 wherein said processing system is configured for an offline processing.

18. The apparatus of claim 1, wherein said processing system is configured for a real-time processing.

19. The apparatus of claim 1, wherein said processing system comprises a floating-point gate array for a real-time processing.

20. The apparatus of claim 1, further comprising an atomic force microscope coupled to said processing system, wherein said processing system is configured to receive said probe signal from said atomic three microscope.

* * * * *

UNITED STATES PATENT AND TRADEMARK OFFICE
CERTIFICATE OF CORRECTION

PATENT NO. : 9,541,575 B2  
APPLICATION NO. : 14/554394  
DATED : January 10, 2017  
INVENTOR(S) : Maxim Dokukin and Igor Sokolov Page 1 of 1

It is certified that error appears in the above-identified patent and that said Letters Patent is hereby corrected as shown below:

In the Specification

At Column 1, Line 5, insert:  
--GOVERNMENT SUPPORT  
This invention was made with government support under grant number 1435655 awarded by the National Science Foundation. The government has certain rights in the invention.--

Signed and Sealed this  
Fourteenth Day of January, 2020

Andrei Iancu  
*Director of the United States Patent and Trademark Office*